Patented June 4, 1929.

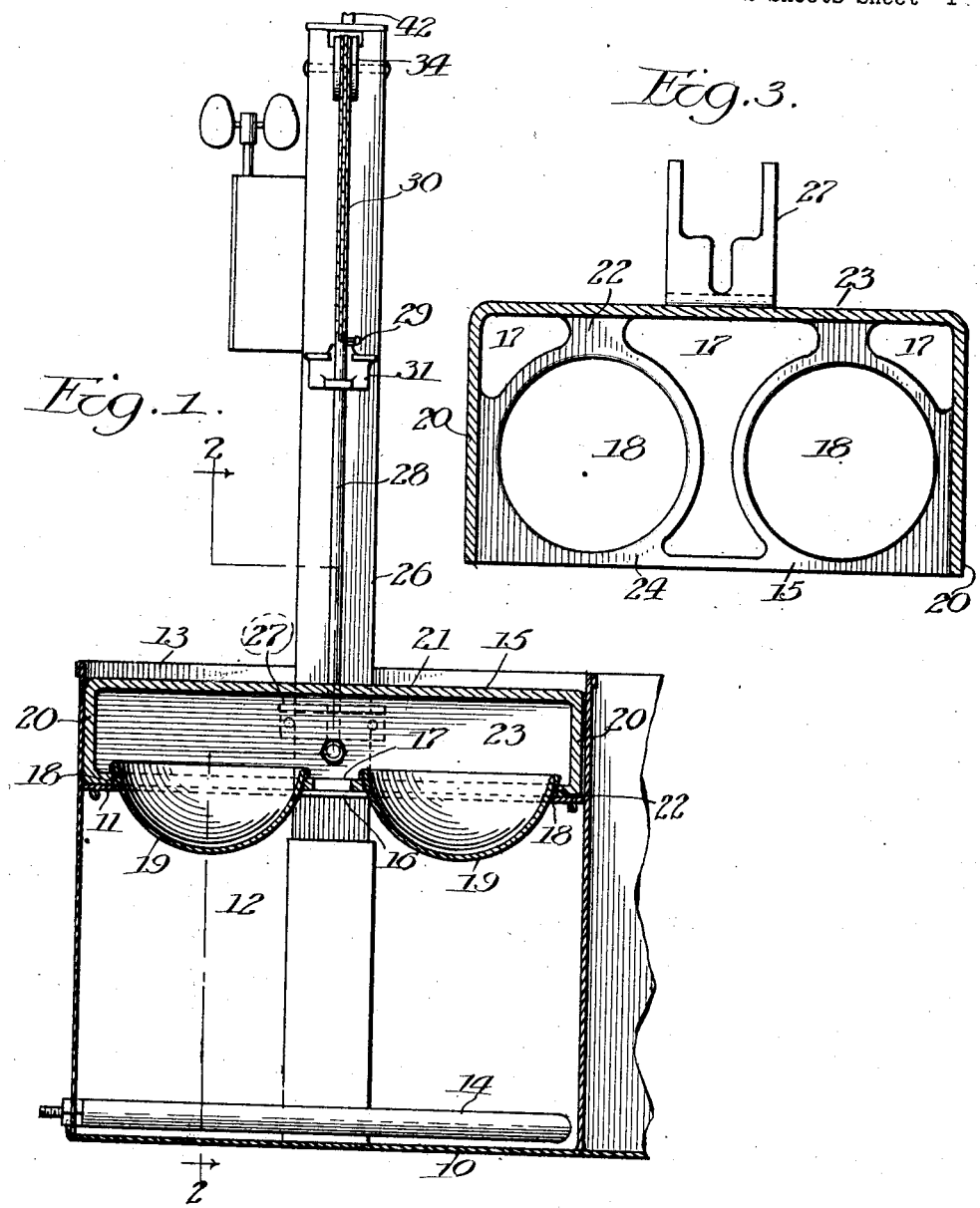

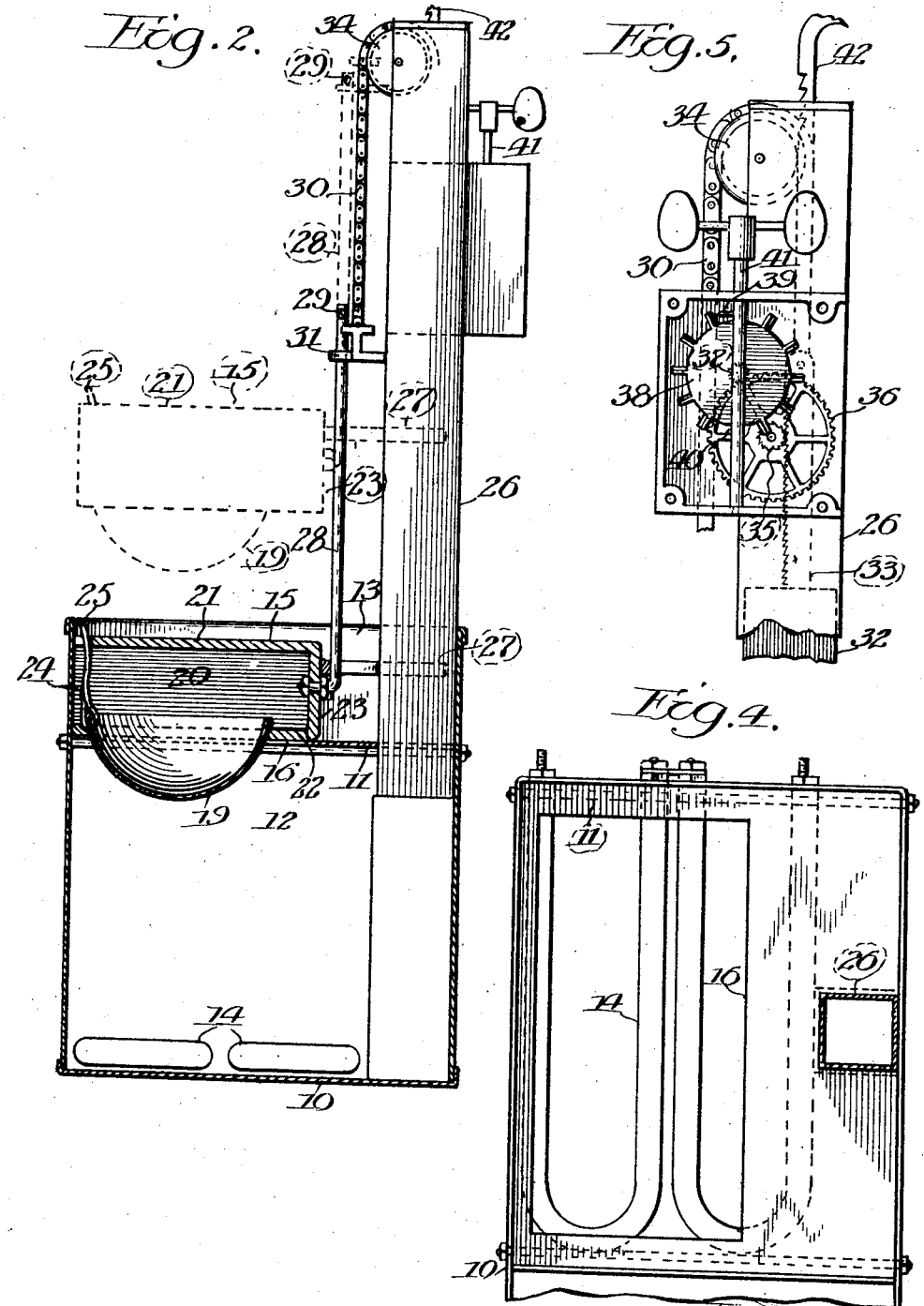

1,716,002

UNITED STATES PATENT OFFICE.

HERBERT W. PARKER, OF CHICAGO, ILLINOIS.

COOKING MACHINE.

Application filed August 29, 1927. Serial No. 216,076.

The invention relates to cooking devices, primarily to egg cookers, and has as its prime object the provision of a means whereby the poaching of an egg may be accomplished without immersing the egg to be poached in the cooking water, and to combine a timing mechanism therewith whereby the egg may be subjected to the cooking process for various specific periods of time depending upon the particular desires of a person.

It is an object of the invention to provide a construction whereby the cooking is accomplished by means of steam and its condensate, both of which act upon the egg in a manner to cook the entire egg.

The invention has as one of its objects the provision of a water chamber having means associated therewith for heating the water contained in said chamber and to provide a second chamber in which the egg to be cooked is located, these chambers having means whereby the steam created in one of the chambers is permitted to enter the chamber containing the egg to accomplish the cooking thereof.

It is a further object of the invention to associate a timing mechanism with the chamber in which the egg is contained so that this chamber may be moved relatively to the steam chamber toward co-operative relation and away therefrom after a predetermined time to thereby arrest the influence of the cooking steam upon the egg.

It is an object to construct the movable chamber so that the condensate may be directed to the top side of the egg so that this part thereof will also be cooked.

The invention has these and other objects and features of construction, all of which will be more readily understood when read in conjunction with the accompanying drawings which show one embodiment of the invention, it being obvious that changes and modifications may be resorted to without departing from the spirit of the appended claims forming a part hereof.

In the drawings:

Fig. 1 is a sectional view looking toward the front of the machine;

Fig. 2 is a central longitudinal section taken on line 2—2 of Fig. 1;

Fig. 3 is a sectional plan view of the egg container;

Fig. 4 is a plan view of the water container; and

Fig. 5 is a view of a part of the timing mechanism.

The embodiment of the invention illustrated in the drawings contemplates the use of a container generally designated 10 which is, by means of the removable wall 11, divided to produce the two chambers 12 and 13. The lower chamber 12 provides a means in which water and a suitable heating element 14 for heating the water is located. In practice, the water level is maintained a suitable distance below the wall 11 so that the egg to be poached, which is contained in the movable chamber 15, is not immersed in the water contained in the chamber 12 but is retained above the same, so that the egg is subjected to the heat of the steam instead of the water to cause the cooking of the egg.

The chamber 15, in which the egg to be poached is located, is movable toward and away from an opening 16 provided in the wall 11, and said chamber is provided with an opening 17 which communicates with the chamber 12 when the chamber 15 is arranged to cover said opening so that the steam generated by the heating element may enter the egg chamber and act upon the egg to accomplish the cooking thereof. This egg chamber 15 is provided with one or more apertures 18—18 which are employed to removably hold the egg cups or holders 19—19, the bottoms of which preferably protrude beyond the chamber 15 into the water compartment 12, above the water in said compartment.

The egg chamber 15 in the present instance is constructed to produce the end walls 20—20, the top and bottom walls 21—22 and the side wall 23, which thus produces an open side 24 in the chamber. This open side is provided to allow the egg cups to be readily arranged within the egg chamber and be removed therefrom.

One wall of the upper chamber 13 of the container 10 forms a means for closing the opening 24 of the egg chamber when the latter is lowered into the chamber 13, and thus the steam generated in the chamber 12 is prevented from escaping from the egg chamber when the latter is in the position just referred to. It is manifest that when the egg chamber is located in a manner to close the opening 16 that the steam contained in the steam chamber 12 will act upon the egg cups, causing them to be heated. It is also evident that the steam, by virtue of the openings 17 in the chamber, is permitted to enter the chamber and act upon the upper side of the egg contained in the cups. It has been found that during the cooking process, certain of the steam in the egg chamber is condensed and finds its way to the upper side of the egg confined in the egg chamber and thus assists in poaching or cooking this part of the egg, giving the latter the proper appearance and condition.

Each of the egg cups is provided with a handle 25 whereby the introduction and removal of the cups to and from the receptacle is facilitated. As before stated, the egg chamber or compartment 15 has a timing mechanism associated therewith whereby this chamber may be arranged relatively to and be removed from the opening 16 in the wall 11 upon the expiration of a certain time period. This timing mechanism may be of the usual construction such as is now employed in egg cookers. Timing devices such as that just referred to usually embody in their construction a hollow standard such as that designated 26. It is contemplated to employ this standard as a part of a guide for the egg chamber during its movement toward and away from the opening 16 in the wall 11. To this end, the egg chamber is provided with a laterally projecting bracket or extension 27 which engages the standard and assists to maintain the chamber in its proper relation to the opening 16 during movement of the egg chamber relatively to the opening 16 and water chamber. The egg chamber is provided with a rod 28 having the stop or pin 29, to which rod one end of a chain 30 of the timing device is connected so that the egg chamber, when moved toward the opening 16, may be brought under the influence of the timing mechanism to be actuated thereby to lift the egg chamber away from the opening.

The chain 30 is connected to the rod 28 by means of the connector or finger piece 31 which is located in spaced relation to the pin 29 when the egg chamber is arranged in cooperative relation to the opening 16, and is arranged in this manner to afford the necessary sudden pull upon the rod 28 to insure the lifting of the egg chamber away from the opening in the wall 11.

The timing mechanism employed may, as before stated, be of the usual type which employs the chain 30, one end of which is secured to the rod 28 and has the weight 32 and the rack 33 secured to its opposite end, it being understood that the chain rides over a roller 34 supported by the upright or standard 26. The rack engages a pinion 35 which is connected with a shaft carrying the gear 36 which meshes with a pinion 37. The shaft of this pinion carries the escapement wheel 38 which co-operates with pins 39 and 40 of the governor shaft 41 of the timing mechanism to regulate the movement of the weight-operated chain. In a timing mechanism of this character, the rack and weight are moved toward a regulating stop 42 upon the lowering of the egg container. In the present instance, however, the chain is movable a certain additional distance by the movement of the finger piece 31 so as to locate the finger piece in spaced relation to the pin 29 of the rod 28 prior to engagement of the stop and weight so as to provide for the sudden lifting action of the egg container as above referred to.

The construction of the timing mechanism is such that when a part of the rack, which is denuded of teeth, reaches a certain position in its downward travel relatively to the pinion with which it co-operates, the restraining action applied to the rack by the pinion and the mechanism connected with the pinion is released, permitting the weight to drop and lift the egg chamber away from the water or steam chamber.

From the foregoing description of the construction and operation of the device, it is manifest that the structure is such that an egg may be poached without immersing it in water, and in which the egg is subjected to steam which is directed in a manner to act upon the entire egg to perform the cooking thereof. It is further evident that means is provided whereby the egg chamber may be moved into and out of co-operative relation to the steam created and be maintained in co-operative relation for various definite periods and be moved after the expiration of any of these periods away from the influence of the heating element and the medium heated thereby.

Having thus explained the construction and operation of the invention, what I claim and desire to cover by Letters Patent is:

1. In a device of the character described, the combination of a chambered member, a member providing a closure for said chambered member, means for moving said second mentioned member relatively to said chambered member, said second mentioned member providing a chamber having a lateral opening adapted to be closed by a side wall of the first mentioned member when said second mentioned member is arranged to provide said closure, said open side providing means whereby egg containers may be introduced and removed from said second mentioned member, and said second mentioned member having means providing for communication between said first and second mentioned chambers when said second mentioned member is arranged to provide said closure.

2. In a device of the character described, the combination of a chambered member, a container providing a closure for said chambered member, said container having means providing for communication between said container and chamber when said container is arranged to provide said closure, means for raising said container relatively to said chambered member, said container having an opening which is exposed to permit of access to the interior of said container when said container is raised.

3. In a device of the character described, the combination of a chambered member having a wall with an opening therein, a container providing a closure for said opening, said container having means for supporting a cup, and an opening providing for communication between said container and chamber through said opening when said container is arranged to close said opening, a standard arranged at one side of the chambered member and container, means for moving said container relatively to said standard and the wall having said opening, and means extending from said container to said standard for guiding said container.

4. In a device of the character described, the combination of a chambered member having a wall with an aperture therein, a container in which cups are adapted to be arranged providing a closure for said opening, said container having means providing for communication between said container and chamber when said container is arranged to provide said closure, and a timing mechanism for moving said container, said timing mechanism having a casing extending above said wall, and said casing providing a guide for said container.

5. In a device of the character described, the combination of a chambered member having an apertured wall, a container providing a closure for said aperture, said container having top, bottom and side walls, the bottom wall thereof having an opening which communicates with said first mentioned chambered member through the aperture in said wall, said wall providing a receptacle support and said container having an opening whereby said receptacle may be removed from said container, and means for moving said container away from the opening in said wall, said means including means for maintaining said container in substantially horizontal alignment with said wall and vertical alignment with said aperture.

6. In a device of the character described, the combination of a chambered member having an apertured wall which divides said chamber into compartments, a chambered member adapted to be removably arranged in one of said compartments and to close said aperture, said second mentioned chambered member having an opening which provides communication with the other of said compartments, and having a side opening which is closed by a wall of said compartment in which said second mentioned chamber is located, egg containers removably located in said second mentioned chambered member, said side opening providing means whereby said egg containers may be introduced to and removed from said second mentioned chambered member, and means for moving said second mentioned chambered member relatively to said aperture in said wall.

7. In a device of the character described, the combination of a chambered member having an apertured wall, and a container adapted to be removably located to close said aperture, said container having an aperture which co-operates with the aperture in said wall to provide a communication between said container and said chamber, said container having means for removably supporting an egg receptacle therein, said container being supported for movement relatively to the wall having said aperture, and means for maintaining said container in substantially parallel relation to said wall during said movement and in substantial alignment with said aperture.

8. In a device of the character described, the combination of a member providing a chamber, said chamber having an opening located at one side thereof through which an egg container may be introduced to and be removed from said chamber, a wall of said chamber providing a support for said container, and said wall having an opening provided therein through which the cooking medium may be introduced to said chamber.

In witness whereof, I hereunto subscribe my name this 27th day of August, A. D. 1927.

HERBERT W. PARKER.